April 23, 1940.  H. B. BABSON ET AL  2,198,048
MILKING PARLOR
Filed April 19, 1938   2 Sheets-Sheet 1
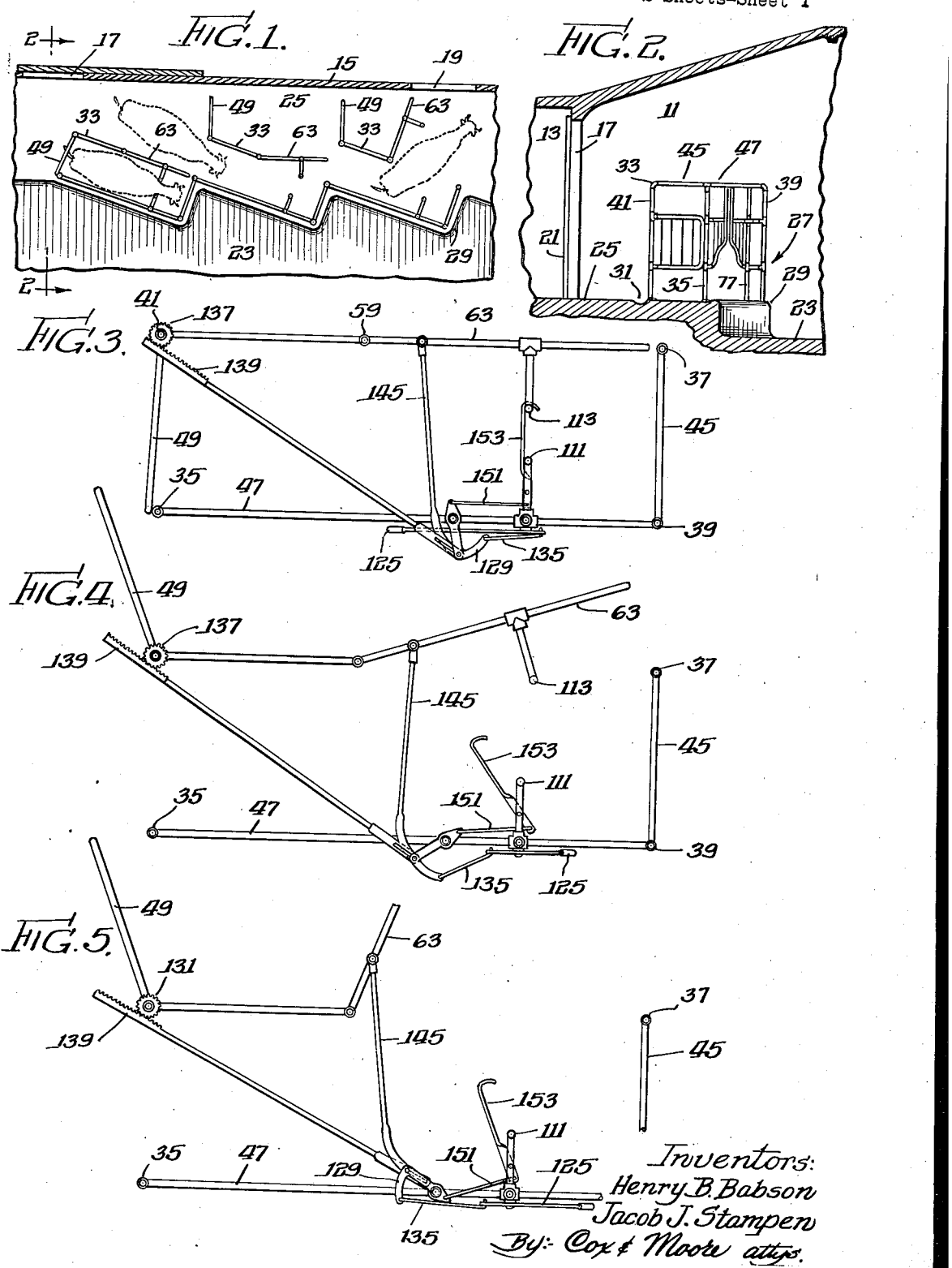
Inventors:
Henry B. Babson
Jacob J. Stampen
By: Cox & Moore attys.

April 23, 1940.  H. B. BABSON ET AL  2,198,048
MILKING PARLOR
Filed April 19, 1938   2 Sheets-Sheet 2
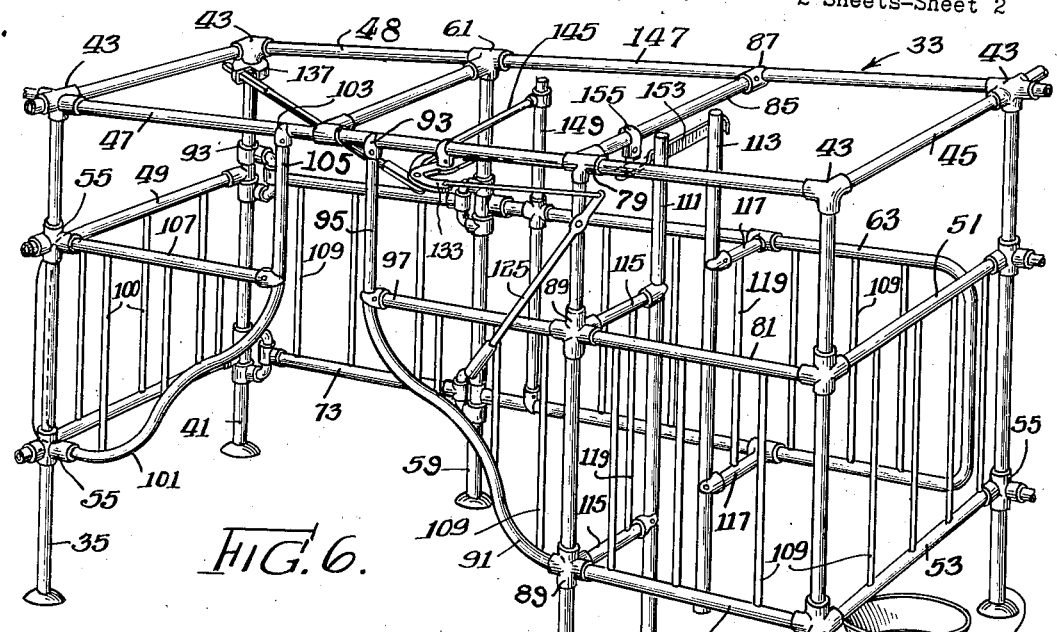
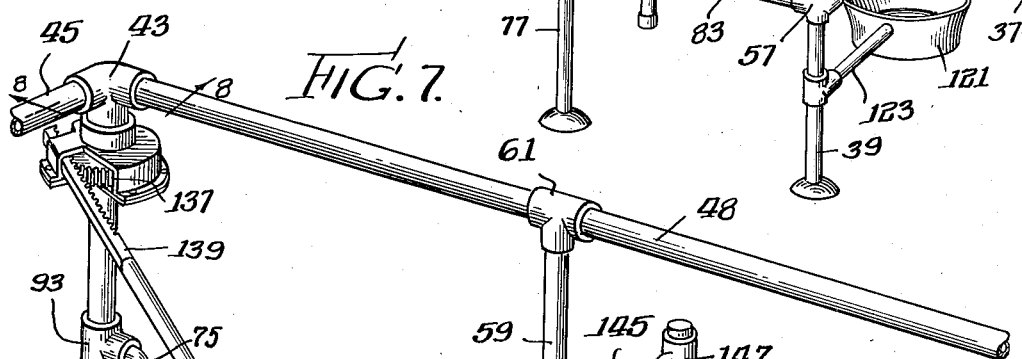
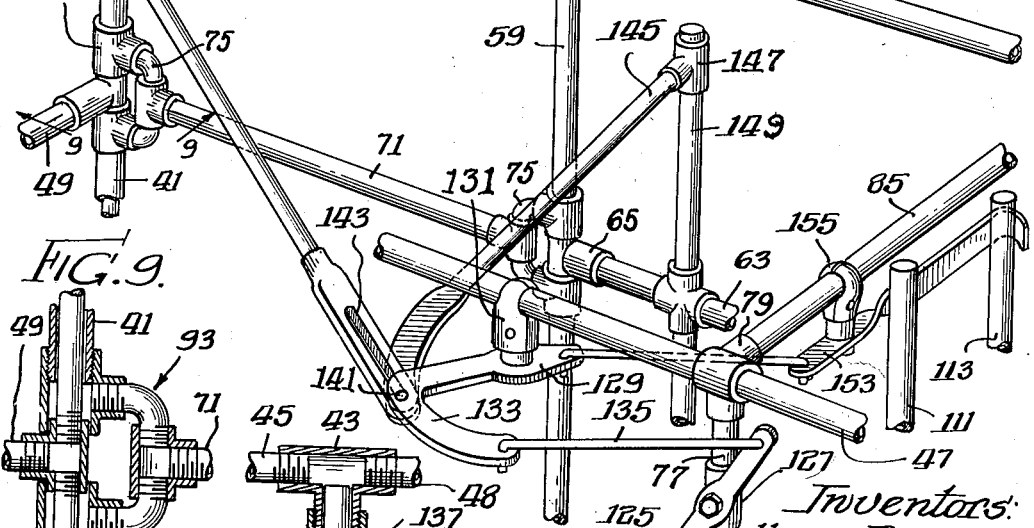
Inventors:
Henry B. Babson
Jacob J. Stampen
By: Cox & Moore attys.

Patented Apr. 23, 1940

2,198,048

UNITED STATES PATENT OFFICE 2,198,048

MILKING PARLOR

Henry B. Babson and Jacob J. Stampen, Chicago, Ill., assignors to Babson Bros., Chicago, Ill., a limited partnership comprising Henry B. Babson and Gustavus Babson Application April 19, 1938, Serial No. 202,884

8 Claims. (Cl. 119—27)

Our invention relates in general to the caging of animals and has more particular reference to the provision of a milking parlor having improved means for entrapping animals in stanchions for milking. The invention has particular reference to a construction for caging animals, including the arrangement of a bank of animal cages, facilitating entry and exit of the animals.

The present invention comprises a continuation in part of our copending application, Serial No. 747,321, filed October 8, 1934, now Patent No. 2,136,228, issued November 8, 1938.

An important object of the invention is to arrange a series of animal stanchions or cages in staggered relationship whereby adjacent cages have common structural portions; a further object being to incline each cage toward the entrance of the milking parlor so that animals in entering the parlor will be guided successively into adjacent cages; a still further object being to provide each cage with an entrance having a door which, when open, will guide the animal into the desired cage and prevent it from entering other cages of the series.

Another important object is to provide a milking parlor having a series of animal cages arranged to provide a substantially unobstructed side view of the animal in each cage, the cages being arranged so that adjacent cages have common structural parts and means requiring each animal entering the parlor to enter a desired cage.

Another important object is to provide a cage or stall having an animal entry and a separate animal exit so that an animal in entering and leaving the cage follows a continuous path of movement, thus eliminating the necessity of backing the animal out of the cage.

Another important object is to provide a milking cage or stall having separate entry and exit openings provided with gates and including gate-operating mechanism whereby the entry and exit gates may be operated in a definite timed relationship so that, when the entry gate is open, the exit gate may be in position to obstruct the exit of the animal, a further object being to operate the several gates in a definite cycle.

Another important object is to provide an animal stall or cage having separate entry and exit openings, including gates for said openings, and mechanism for operating the gates in a predetermined cycle to permit the entry and entrapment of an animal in the cage and the subsequent release and exit of the animal, the entry gate being opened after the opening of the exit gate and remaining open after the exit gate is closed sufficiently to prevent escape of the animal from the stanchion, the entry gate being subsequently closed to entrap the animal in the stanchion; a further object being to form the exit gate with means adapted, when the gate is fully closed, to secure the neck of the animal in the stall.

Another important object is to provide an animal stall having separate entrance and exit openings, the exit opening having a gate adapted to remain at least partially closed as the animal enters the cage, and having means for fully closing the exit gate after the animal is in place in the stall, said exit gate when fully closed having stanchion means adapted to secure the neck of the animal to prevent undue movement thereof in the cage during the milking operation.

Numerous other objects, advantages and inherent functions of the invention will be apparent from the following description, which, taken in connection with the accompanying drawings, discloses a preferred embodiment of the invention.

Referring to the drawings:

Figure 1 is a diagrammatic plan view of a milking parlor embodying our present invention;

Figure 2 is a section taken substantially along the line 2—2 in Figure 1;

Figures 3, 4 and 5 are diagrammatic views illustrating the progressive positions occupied by the gates and the gate operating mechanism of an animal cage embodying our present invention;

Figure 6 is a perspective view illustrating a cage made in accordance with the teachings of our present invention;

Figure 7 is a perspective view illustrating the details of gate operating mechanism; and Figures 8 and 9, respectively, are sectional views taken substantially along the lines 8—8 and 9—9 in Figure 7.

To illustrate our invention, we have shown on the drawings a milking parlor comprising a milking room or station 11 and a waiting room 13 preferably separated by a partition or wall 15 having a door opening 17, through which animals to be milked may enter the milking room 11 from the waiting room 13, and a door opening 19, through which the animals may escape from the room 11 after being milked. The openings 17 and 19 may, if desired, be provided with preferably sliding doors 21. The room 11 has a main floor 23 having an elevated portion 25 forming a milking platform or stage 27 across the end of the room adjacent the wall 15. The forward edge of the platform 25 is provided with a coping or ridge 29 extending at a slight elevation above the upper level of the platform which is provided with drainage means, as, for instance, the gutter 31, behind the coping. Cages or stalls 33 are erected upon the platform to receive and entrap animals therein during the milking operation. The stalls 33 are arranged adjacent the forward edge of the platform and each has an entry way facing toward the door opening 17 to facilitate entry into the cages of animals entering the room 11 through said door opening. The cages are also arranged so that a substantially unobstructed view of the animals therein is afforded to spectators in the room 11 on the main floor 23. The stalls are preferably of rectangular construction and are arranged in staggered relationship with a corner of one stall coinciding with and forming the diagonally opposite corner of the next adjacent stall. This arrangement not only permits the gated entry end of each stall to face the door opening 17, but also affords a substantially unobstructed view of the animals in every stall, and, furthermore, reduces the cost of material required in the construction since adjacent stalls have common structural elements. It will be seen that the stalls 33 comprise a series, the longitudinal axis of each stall of the series being inclined with respect to the wall 15, and the side of the structure facing away from the wall 15 provides an indented configuration clearly shown in Figure 1. The forward edge of the platform 25 is arranged to conform with the indented outer wall of the series so that dairy operators in attendance may perform all the necessary manipulative operations including adjustment of milking apparatus, opening and closing the entry and exit gates, and the like, while remaining on the main floor 23 adjacent the cages and may have a free and unobstructed view of the animals in each stall and of the milking operation.

The cage may be formed of any suitable material and in any desired fashion; however, we prefer to build the same of structural members comprising metal tubes or pipes. To this end the cage or stall 33 may comprise four corner uprights 35, 37, 39 and 41, the upright 37 of one stall forming the diagonally opposite upright 35 of the next adjacent stall of the series. The lower ends of the members 35, 37, 39 and 41 are preferably embedded in or otherwise secured on the floor 25, on which the cage is erected, the preferred arrangement being to form the platform of concrete and to anchor the lower ends of the uprights in the concrete at the time it is laid.

The uprights are provided with brackets 43 affording means to connect their upper ends with the ends of horizontal connecting members 45, 47 and 48, which interconnect and maintain the upper ends of the uprights in spaced relationship. The space defined between the uprights 35 and 41 affords an entrance opening into the cage. The upright 41 supports a gate 49 comprising a structural member arranged in substantially U-form, the parallel arms extending horizontally and connected at their ends with the upright 41. The gate 49 is arranged to swing into position obstructing the entrance opening between the uprights 35 and 41 in order to form a closure for said entrance. The end of the cage, opposite from the entrance opening, is closed by means of horizontal connecting rods 51 and 53 mounted in and extending between brackets 55 on the upright 37, and 57 on the upright 39.

One side of the cage may comprise an upright 59 connected at its upper end in a bracket 61 carried by the horizontal connecting member 48 extending between the uprights 41 and 37. This upright 59 carries a gate 63, which normally extends in the opening defined in the side wall of the cage between the upright 59 and the corner upright 37, said opening affording a cage exit. The gate 63 may be turned about the axis of the upright 59 to a position permitting an animal in the cage to escape through the exit. The gate 63 preferably comprises a structural member of substantially U-shaped configuration having horizontally extending arms, the free ends of which are pivotally fastened to the upright 59 by means of brackets 65. The opening between the uprights 41 and 59 is permanently closed by means of a frame comprising horizontal members 71 and 73, the opposite ends of which are carried in brackets 75 supported on the uprights 41 and 59.

The side of the cage, facing away from the partition 15, comprises an upright 77 secured at its lower end on or in the platform 25 and secured at its upper end to the connecting member 47 extending between the upper ends of the uprights 35 and 39 by means of a bracket 79. A connecting brace 85 also is preferably provided between the spaced members 47 and 48 on opposite sides of the cage, said brace 85 being fastened at one end to the bracket 79 on one member 47 and at its other end to a bracket 87 carried by the other member 47. The space between the uprights 39 and 77 is closed by means of horizontal members 81 and 83 extending between and fastened to the brackets 57 and brackets 89 on the upright 77. The lower bracket 89 on the post 77 receives the end of a closure member 91, which extends from the bracket 89 horizontally into the space between the upright 77 and 35, and thence upwardly to form an upright portion 95, the end of which is fastened in a bracket 93 carried on the horizontal member 47.

The upper bracket 89 receives one end of a horizontally extending member 97, the opposite end of which is connected with the upright portion 95 of the member 91. The upright 35 also carries a member 101 similar in shape to the member 91 and which extends from the upright 35 into the space between the uprights 35 and 77. The member 101 is fastened at one end to and extends horizontally from the lower bracket 55 on the upright 35, the member 101 being formed with an upright portion 105, which extends parallel to and spaced from the upright portion 95 of the member 91, being fastened in a bracket 103 carried by the connecting member 47 near the bracket 93. The upper bracket 55 on the upright 35 receives one end of a horizontally extending member 107, the other end of which is connected to the upright portion 105 of the member 101. Vertical members 109 are mounted in spaced apart relationship between and connected at their opposite ends to the spaced members 51 and 53, 71 and 73, 81 and 83, the spaced arms of the U-shaped gate frames 49 and 63 and between the horizontal bars 97 and 107 and the horizontally extending portions 91 and 101, in order to close in the sides of the cage.

The upright 77 and the exit gate 63 carry members 111 and 113, the member 111 being fastened by means of members 115 to the upright 77 by means of the brackets 89. The member 113 is similarly fastened to and carried by the gate 63 by means of the members 117 so that when the gate 63 is closed, the members 111 and 113 will extend vertically in spaced-apart position whereby the neck of an animal in the cage will be secured therebetween, the uprights 111 and 113 thus forming a neck yoke. Vertical members 119, similar to the members 109, are or may be fastened between the members 115 and the members 117 in order to prevent insertion of the head of the animal between the uprights 77 and 111 and between the gate 63 and the upright 113.

We prefer also to mount a feed container 121, preferably in the form of a pan, in a bracket 123 journalled on the upright 39 in position to be swung within the cage in front of the stanchion members 111 and 113. The bracket 123 provides for swinging the container 121 outside of the stanchion in position readily accessible for filling and emptying by an attendant on the main floor 23. The pan 121 may also be easily removed from the bracket 123 in order to facilitate cleaning.

The gate-carrying upright 41 of each stall is preferably arranged sufficiently close to the wall 15 so that when the gate 49 is open, it will block the passageway between the upright 41 and the wall 15 so that an animal entering the milking room will be prevented from passing along the runway, between the stalls and the wall 15, beyond a stall of which the entrance door is open. The animal entering the milking room is thus required to enter a desired stall. When the entrance door 49 is open, the exit door 63 may be at least partially closed to prevent the animal from making an immediate exit. The exit door 63, however, is sufficiently open to permit the animal to insert its head between the uprights 111 and 113. As soon as the animal has thus entered the stall, the gate 63 is operated to fully close the neck yoke, comprising the uprights 111 and 113, about the neck of the animal, to thereby trap the animal in position to be milked in the cage. The entrance door 49 may be closed at the same time. After the milking operation is completed, the exit door 63 is opened, thus simultaneously releasing the neck of the animal from the stanchion and the animal is permitted to leave the stall. The exit door, when fully open, blocks return of the animal through the passageway between the stalls and the wall 15 toward the door 17 so that the animal is forced to leave the milking room through the door 19, thus avoiding congestion and interference with entering animals.

It will be seen that the arrangement provides for a continuous progressive movement of the animals through the door 17 into any desired stall of the series; and then, after the milking operation is completed, the animals pass in a forward direction through the stall exit and subsequently leave the milking room through the door 19. Confusion, through the necessity of backing animals out of the stalls and from requiring the milked animals to leave the milking parlor by the same door through which they enter, is consequently avoided, and milking is accomplished in a speedy and efficient manner.

In order to control the entrance and exit doors conveniently, we provide means for controlling the operation of the same from a single control located preferably in position accessible to an attendant stationed on the floor 23. To this end, we provide a tiltable control handle 125 preferably mounted on a bracket 127 carried by the upright 77. This handle may be moved successively to several control positions; and means cooperatively associated with the control handle is provided so that when the handle is in the one position, both of the doors 49 and 63 are fully open to permit the animal to escape from the stall. After the animal has escaped, the handle may be moved to another control position, in which the exit door is partially closed, the entrance door remaining fully open to permit an animal to enter the stall and insert its head between the bars 111 and 113. The handle may then be moved to still another position, closing the entrance gate and locking the yoke pieces 111 and 113 about the neck of the animal.

This sequence of operation may, of course, be accomplished by any suitable mechanism, but we prefer to utilize and, therefore, illustrate a lever member 129 pivoted on a support 131 fastened to the member 47 adjacent the upright 77. The lever 129 has an arm 133, which is conneced by means of a rod 135 to the control handle 125, so that, when the control 125 is moved, the lever 129 will likewise be turned on its axle 131. The upright 41 carries a rotatable member on which the gate 49 is secured. On this rotatable member is also fastened a pinion 137, preferably of fragmentary character, which is drivingly engaged with a rack 139, which in turn is drivingly connected with the lever 129, so that the rack 139 moves in response to the rotation of the lever 129 on its axle. The driving connection between the rack 139 and the lever 129 preferably comprises a lost-motion arrangement illustrated specifically as a driving pin 141 carried on the lever 129 and operating in a slot 143 formed in the rack bar. The pin 141 also drives a rod 145 connected with the gate 63 preferably by being journalled as at 147 on a projection 149 carried by the gate 63.

The relative position of the gate-operating mechanism shown in Figures 3, 6 and 7 is that occupied by the parts when both gates are fully closed and the stanchion is latched by means of a detent comprising a lever 153 pivoted on a bracket 155 carried by the brace 85. In order to release an animal trapped in the cage, the handle 125 is moved from the position shown in Figures 3, 6 and 7 in a counterclockwise direction, so that the lever 129 is moved in a direction immediately to impart longitudinal movement to a connecting rod 151 in a direction to turn the latch lever 153 in a direction to release its hooked end 157 from engagement with the movable member 113 of the stanchion and thus permit opening movement of the member 113 and the gate 63, on which it is mounted. At the same time, the connecting rod 145 will be moved longitudinally toward the right, viewing Figure 7, and will cause initial opening movement of the exit gate 63. The gate 49, however, will not initially be moved because of the lost-motion provided by the sliding of the pin 141 in the slot 143. When the exit gate 63 is partially opened, however, the pin 141 will have reached the end of the slot 143 and will commence to move the rack 139 in order to open the entrance gate, so that thereafter the entrance and exit gates open simultaneously.

The animal in the stall, when the exit gate is fully open, as shown in Figure 5, will naturally move forwardly out of the stall through the exit opening and will, as heretofore mentioned, be directed toward the door 19. After the animal has left the stall, the handle 125 is moved in a clockwise direction, which causes the exit gate to partially close, to the position shown in Figure 4, without, however, moving the open entrance gate, the lost-motion connection between the lever 129 and the rack bar 139 permitting this operation. The slot 143 is long enough to permit the exit gate to be closed sufficiently to prevent the escape of an animal through the exit opening without preventing insertion of the head of the animal between the yoke members 111 and 113. Meanwhile, the entrance door remains in fully opened position.

It will be noted that the yoke members 111 and 113 form a part of the exit gate and that the animal in passing from the stall passes entirely between the yoke members. An animal entering through the door 17 will be guided into the open cage entrance and will insert its head between bars 111 and 113 but may not pass through the partially closed exit gate. Thereupon, the lever 125 may be moved to the position shown in Figures 3, 6 and 7, which movement will simultaneously cause the complete closure of the exit gate, the entrapment of the neck of the animal between the yoke members 111 and 113, the closure of the entrance gate 49 and the latching of the stanchion by means of the member 153, the curled end 157 of which hooks around the stanchion member 113.

The milking cage of our present invention is adapted to permit an animal enclosed in the cage to be milked by any preferred milking method, although the cage is particularly well adapted for use where milking is accomplished by mechanical means. The horizontal portions of the members 91 and 101 are deformed at 159 to provide a space or opening substantially opposite the udder of the animal in the cage so that milking may, if desired, be accomplished by hand. The cage, however, is well adapted to faciliate the use of mechanical milking apparatus.

The opening between the upright portions 95 and 105 facilitates the application of mechanical milking apparatus which may be suspended from the animal itself as by means of a belt extending across the back of the animal, with the opposite ends of the belt connected to the milking apparatus, which thus may be easily adjusted by an attendant through the aforesaid opening defined by the bent portions 195 of the members 91 and 101. Alternately, the milking apparatus may be supported on the cage itself as, for example, by the suspension mechanism which forms the subject-matter claimed in our co-pending application, Serial No. 747,321, aforesaid.

It is thought that the invention and numerous of its attendant advantages and inherent functions will be understood from the foregoing description, and it is obvious that numerous changes may be made in the form, construction, and arrangement of the several parts without departing from the spirit or scope of our invention, or sacrificing any of its attendant advantages, the form herein described being a preferred embodiment for the purpose of illustrating our invention.

Having thus described our invention, what we claim as new and desire to secure by Letters Patent is as follows:

1. An animal cage having an entrance and an exit comprising a yoke adapted when closed to entrap the neck of an animal in the cage and when open to release the neck of the animal and permit the animal to escape from the cage through the open yoke, and a manually operable member for opening and closing said yoke, a latch to secure the yoke in latched position, and means actuated by said member for tripping the latch.

2. An animal cage comprising a plurality of uprights, a pair of said uprights defining a cage entrance, another pair of said uprights defining a cage exit, gate forming means on said cage at said entrance and at said exit, and gate-operating means comprising a lever, means operatively connecting said lever with each of said gates whereby manipulation of said lever may control both of the gates, the means, connecting said lever with at least one of said gates, including a connection whereby the operation of said gate may take place in a predetermined delayed sequence with respect to the other gate.

3. An animal cage comprising a plurality of uprights, a pair of said uprights defining a cage entrance, another pair of said uprights defining a cage exit, gate-forming means swingably mounted on said cage at said entrance and at said exit, and gate-operating means comprising a lever, means operatively connecting said lever with each of said swingably mounted gate-forming means whereby manipulation of said lever may control both of the gate-forming means, the means, connecting said lever with at least one of said gate-forming means, including a lost motion connection whereby the operation of said one of the gate-forming means may take place in a predetermined delayed sequence with respect to the other of said gate-forming means.

4. An animal cage comprising a plurality of uprights, a pair of said uprights defining a cage entrance, another pair of said uprights defining a cage exit, gate-forming means swingable on said cage at said entrance and at said exit, and gate-operating means comprising a lever, means operatively connecting said lever with each of said swingable gate-forming means whereby manipulation of said lever may control both of the gate-forming means, the means, connecting said lever with at least one of said gate-forming means, including a connection whereby the operation of said gate-forming means may take place in a predetermined delayed sequence with respect to the other gate-forming means, at least one of said gate-forming means comprising a rotatable upright formed with a gear, and the means connecting the lever with said gate-forming means comprising a movable rack in meshing engagement with said gear.

5. A milking station comprising a plurality of milking cages of generally rectangular configuration, and comprising an upright member forming the corner of one cage and also the diagonally opposite corner of the next adjacent cage, said cages having entrance and exit openings arranged therein such that said upright defines a side of the exit opening of one cage and also defines a side of the entrance opening of the next adjacent cage.

6. A milking station as set forth in claim 5, including an entrance and an exit gate for each cage, and manually operable means on each cage for opening and closing the gates thereof in a predetermined sequence.

7. A milking station as set forth in claim 5, including swingable gate-forming means rotatably mounted at the exit of one cage and at the entrance of the next adjacent cage, the entrance gate-forming means of one cage and the exit gate-forming means of the other both cooperating with said upright member when in closed position.

8. A milking station as set forth in claim 5, including an entrance and an exit gate for each cage, and manually-operable means on each cage for openng and closing the gates thereof in a predetermined sequence, the entrance gate of one cage and the exit gate of the other both closing upon said upright member.

HENRY B. BABSON.
JACOB J. STAMPEN.